United States Patent
Goto et al.

(10) Patent No.: US 8,820,292 B2
(45) Date of Patent: Sep. 2, 2014

(54) SPARK-IGNITION INTERNAL COMBUSTION ENGINE

(75) Inventors: Tsuyoshi Goto, Hiroshima (JP); Hidetoshi Kudou, Higashihiroshima (JP); Yasushi Nakahara, Higashihiroshima (JP); Masami Nishida, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 252 days.

(21) Appl. No.: 12/907,394

(22) Filed: Oct. 19, 2010

(65) Prior Publication Data
US 2011/0094473 A1   Apr. 28, 2011

(30) Foreign Application Priority Data

Oct. 22, 2009   (JP) ................. 2009-243571

(51) Int. Cl.
    *F02F 3/26*   (2006.01)
(52) U.S. Cl.
    USPC ........... 123/276; 123/279; 123/294; 123/295; 123/302; 123/406.59
(58) Field of Classification Search
    USPC ......... 123/260, 276, 279, 295, 302, 305, 310, 123/316, 430, 197.3, 197.4, 661, 664–666
    See application file for complete search history.

(56) References Cited

U.S. PATENT DOCUMENTS

| | | | | |
|---|---|---|---|---|
| 4,421,081 A | * | 12/1983 | Nakamura et al. | 123/310 |
| 4,491,104 A | * | 1/1985 | Fujii et al. | 123/291 |
| 5,357,936 A | * | 10/1994 | Hitomi et al. | 60/605.2 |
| 6,325,040 B1 | * | 12/2001 | Tanaka | 123/294 |
| 6,553,959 B2 | * | 4/2003 | Xu et al. | 123/295 |
| 6,588,396 B1 | * | 7/2003 | Cleary et al. | 123/276 |

(Continued)

FOREIGN PATENT DOCUMENTS

| | | |
|---|---|---|
| DE | 100 10 180 A1 | 9/2000 |
| EP | 0 778 403 A1 | 6/1997 |

(Continued)

OTHER PUBLICATIONS

Japanese Office Action "Notification of Reasons for Rejection" dated Feb. 21, 2012; Japanese Patent Application No. 2009-243571 with translation.

(Continued)

*Primary Examiner* — Erick Solis
*Assistant Examiner* — Carl Staubach
(74) *Attorney, Agent, or Firm* — Studebaker & Brackett PC

(57) ABSTRACT

Provided is a spark-ignition internal combustion engine capable of ensuring engine output power while setting a geometric compression ratio of an engine body to a high value. In the spark-ignition internal combustion engine, each of a clearance between a top surface (3a) of a piston (3) located at a top dead center position and a lower surface (8a) of each of two intake valves (8) in a full-closed state, and a clearance between the top surface (3a) of the piston (3) located at the top dead center position and a lower surface (9a) of each of two exhaust valves (9) in a full-closed state, is set to 5 mm or more, and a stroke length S of the piston (3) is set to satisfy the following relation: $S \leq 0.977 \times B + 18.2$, where B is a bore diameter of a cylinder.

6 Claims, 6 Drawing Sheets

(56) References Cited

U.S. PATENT DOCUMENTS

| | | |
|---|---|---|
| 6,769,404 B2 | 8/2004 | Aoyama et al. |
| 7,484,498 B2 * | 2/2009 | Hitomi et al. ............ 123/406.45 |
| 7,650,872 B2 * | 1/2010 | Nishimoto et al. ........... 123/279 |
| 7,784,443 B2 * | 8/2010 | Hitomi et al. ............ 123/406.47 |
| 2005/0120995 A1 | 6/2005 | Tsujimoto et al. |
| 2008/0147301 A1 * | 6/2008 | Irisawa ........................ 701/103 |

FOREIGN PATENT DOCUMENTS

| | | | |
|---|---|---|---|
| JP | S61-85516 A | | 5/1986 |
| JP | H2-215922 A | | 8/1990 |
| JP | H9-79038 A | | 3/1997 |
| JP | 2002-285876 A | | 10/2002 |
| JP | 2003-214297 A1 | | 7/2003 |
| JP | 2003-239836 A | | 8/2003 |
| JP | 2007-9768 A | | 1/2007 |
| JP | 2007-154827 A | | 6/2007 |
| JP | 2009-162153 | * | 7/2009 .............. F02B 23/08 |
| JP | 2009-162153 A | | 7/2009 |

OTHER PUBLICATIONS

Japanese Office Action "Notice of Reasons for Rejection" with mailing date of Jul. 5, 2011; Japanese Patent Application No. 2009-243571 with translation.
Wikipedia, Compression Ratio, http://en.wikipedia.org/wiki/compression_ratio#typical_compression_ratios; retrieved on Sep. 9, 2011; p. 2, line 10-p. 2, line 20.
The Extended European Search Report dated Sep. 22, 2011; European Patent Application No./Patent No. 10188314.8-2311 / 2314841.
Japanese Office Action "Questioning" dated May 14, 2013, which corresponds to Japanese Patent Application No. 2009-243571 and is related to U.S. Appl. No. 12/907,394 with translation.
An Office Action; "Notice of Reasons for Rejection," issued by the Japanese Patent Office on Nov. 19, 2013, which corresponds to Japanese Patent Application No. 2013-021640 and is related to U.S. Appl. No. 12/907,394; with English summary.

* cited by examiner

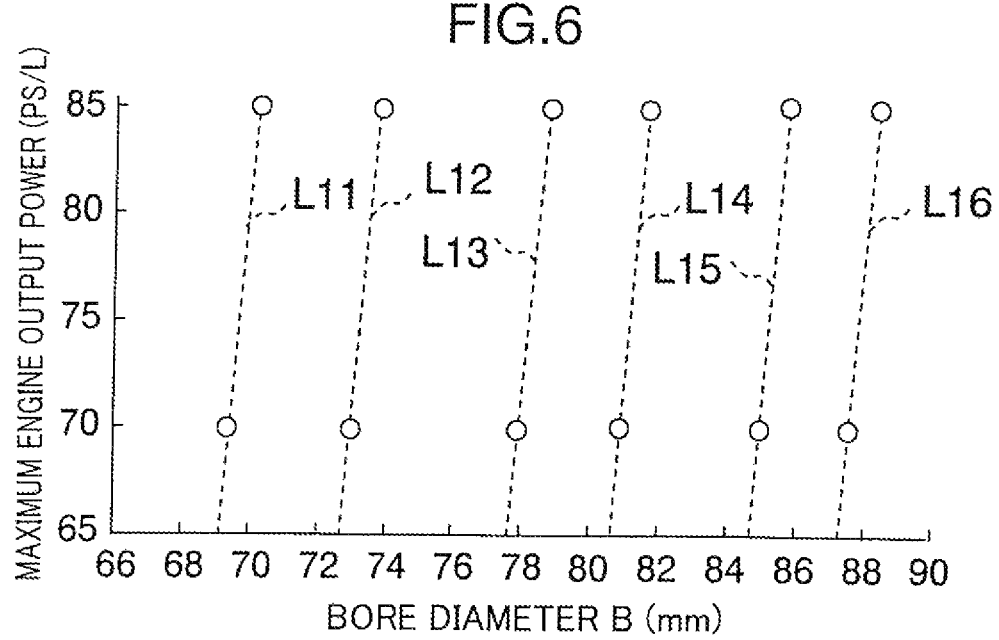

SPARK-IGNITION INTERNAL COMBUSTION ENGINE

BACKGROUND OF THE INVENTION

1. Field of the Invention

The present invention relates to a spark-ignition internal combustion engine, and particularly to a spark-ignition internal combustion engine comprising an engine body configured to have a high geometric compression ratio.

2. Description of the Background Art

Heretofore, in a spark-ignition internal combustion engine, there have been conducted various researches on a configuration of an engine body. For example, JP 2007-154827A discloses a result obtained through research on a height of a combustion chamber with a focus on collision between a flame and a combustion chamber wall. Specifically, if a flame prematurely collides with a combustion chamber wall, a flame growth rate becomes lower and thereby a combustion duration becomes longer, which leads to deterioration in engine thermal efficiency. With a view to suppressing such thermal efficiency deterioration, a spark-ignition internal combustion engine disclosed in the above patent publication is configured such that a spherical-shaped cavity (concave portion) is formed in a top surface of a piston at a position corresponding to a spark plug, to allow a region of a combustion chamber corresponding to the spark plug to be increased in height.

Meanwhile, it is conventionally known that a higher geometric compression ratio of an engine body provides enhanced engine thermal efficiency and improved fuel economy.

The conventional spark-ignition internal combustion engine disclosed in the above patent publication makes it possible to delay collision between a flame and a piston. However, in an engine body configured to have a high geometric compression ratio, if a height of a combustion chamber is simply increased to delay the collision, engine output power is liable to become insufficient.

Specifically, if it is attempted to increase the height of the combustion chamber while setting the geometric compression ratio of the engine body to a high value, a stroke length of the piston becomes longer along with the increase in height of the combustion chamber. If the stroke length becomes longer under the same engine displacement, a bore diameter of a cylinder becomes relatively smaller. If the bore diameter of the cylinder becomes smaller, a diameter of an intake valve provided in a cylinder head defining a ceiling of the combustion chamber becomes smaller and thereby an opening area of the intake valve becomes smaller. The smaller opening area of the intake valve is liable to cause failing to charge a sufficient amount of intake air during an increase in engine speed, resulting in lowering of engine output power.

SUMMARY OF THE INVENTION

It is an object of the present invention to provide a spark-ignition internal combustion engine capable of ensuring engine output power while setting a geometric compression ratio of an engine body to a high value.

In order to achieve this object, the present invention provides a spark-ignition internal combustion engine which comprises: an engine body including a cylinder, a piston adapted to be reciprocatingly moved within the cylinder, and a cylinder head provided on the cylinder to define a combustion chamber in cooperation with a top surface of the piston; two intake valves provided in the cylinder head and each capable of shutting off an inflow of air into the cylinder; two exhaust valves provided in the cylinder head and each capable of shutting off an outflow of exhaust gas from the cylinder; a spark plug provided in the cylinder head to face the combustion chamber; and a fuel injection valve provided in the cylinder head to face the combustion chamber, wherein: a geometric compression ratio of the engine body is set to 14 or more; each of a clearance between the top surface of the piston located at a top dead center position and a lower surface of each of the intake valves in a full-closed state, and a clearance between the top surface of the piston located at the top dead center position and a lower surface of each of the exhaust valves in a full-closed state, is set to 5 mm or more; and a stroke length S of the piston is set to satisfy the following relationship: $S \leq 0.977 \times B + 18.2$, where B is a bore diameter of the cylinder.

This spark-ignition internal combustion engine makes it possible to largely ensure an opening area of the intake valve and therefore a cylinder air charge amount to achieve high engine output power, while setting the geometric compression ratio of the engine body to 14 or more.

BRIEF DESCRIPTION OF THE DRAWINGS

FIG. 6 is a graph showing a relationship between the bore diameter and a maximum engine output power.

DESCRIPTION OF THE PREFERRED EMBODIMENTS

With reference to the drawings, the present invention will now be described based on an embodiment thereof.

Figure 1:
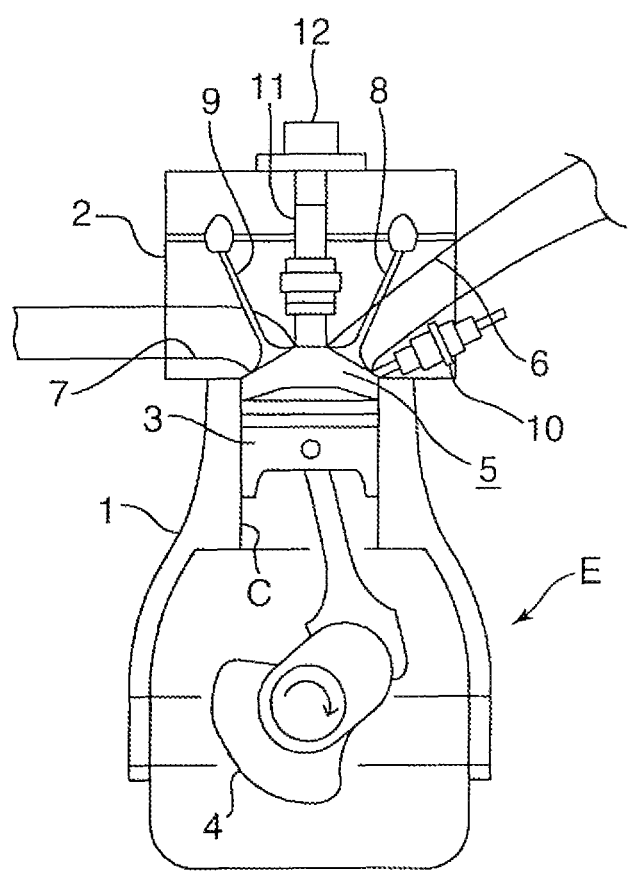
FIG. 1 is a schematic block diagram of a spark-ignition internal combustion engine according to one embodiment of the present invention.

FIG. 1 is a schematic block diagram of an engine E (spark-ignition internal combustion engine) according to one embodiment of the present invention. This engine E is a four-cycle spark-ignition internal combustion engine adapted to be mounted on a vehicle such as an automobile. An engine body (internal combustion engine body) of the engine E comprises a cylinder block 1 and a cylinder head 2 placed on the cylinder block 1. A plurality of cylinders C are defined inside the cylinder block 1 and the cylinder head 2. While the number of the cylinders C is not particularly limited, it may be four, for example. A piston 3 is fittingly inserted into each of the cylinders C in such a manner that it is slidably moved up and down in FIG. 1 along an axis c1 (see FIG. 2) of the cylinder C. The piston 3 is connected to a crankshaft 4 rotatably supported by a lower portion of the cylinder block 1, through a connecting rod. A reciprocating movement of the piston 3 is converted to a rotational movement of the crankshaft 4.

Figure 2:
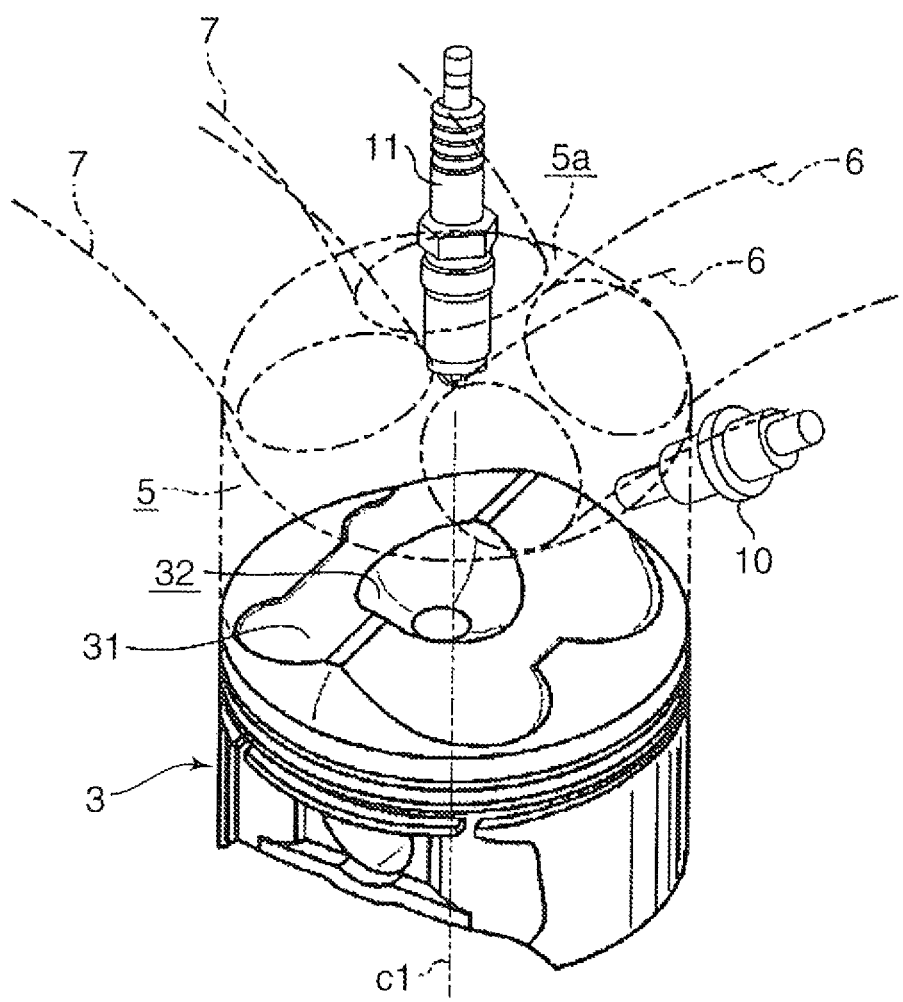
FIG. 2 is a schematic perspective view showing a structure around a combustion chamber.
Figure 3:
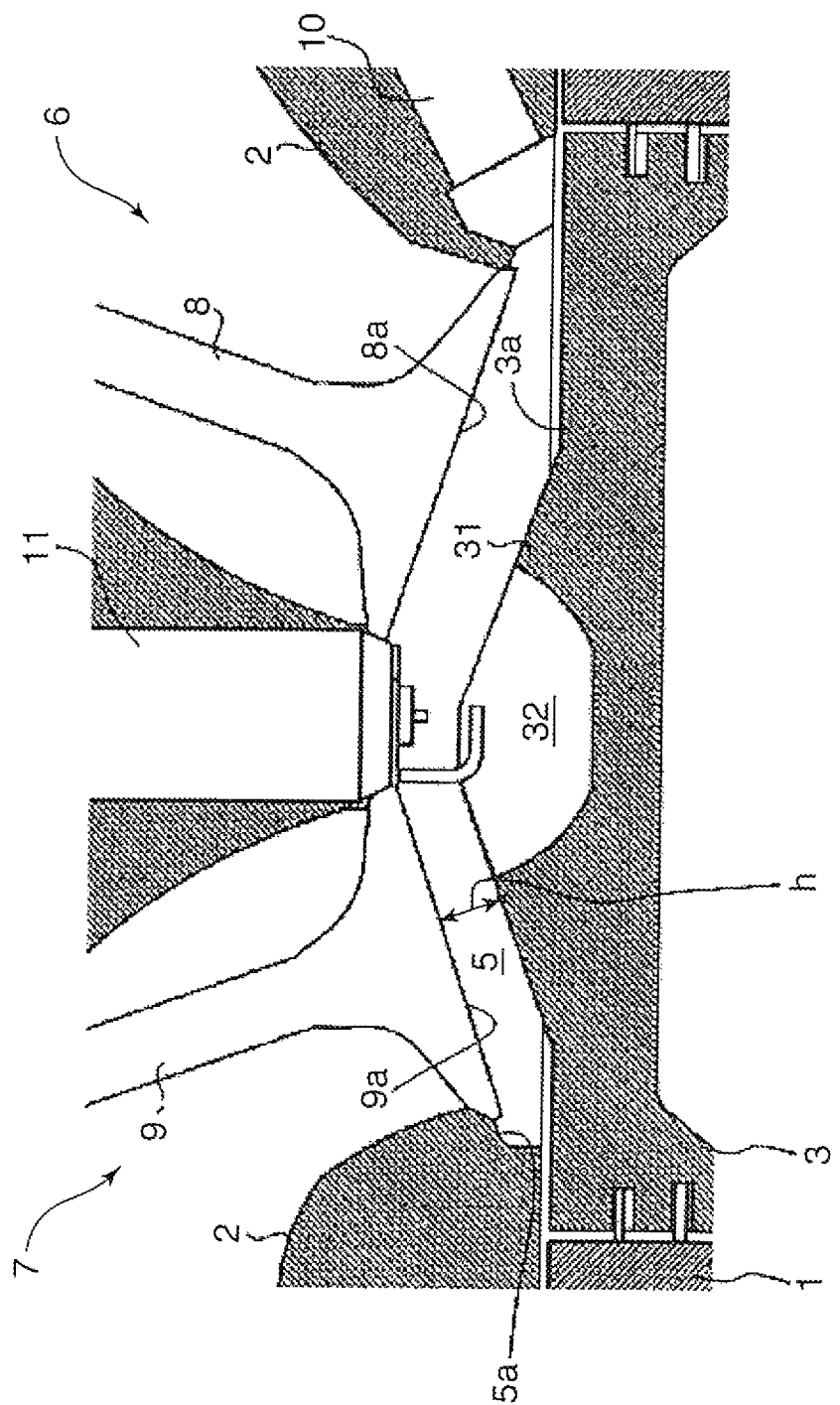
FIG. 3 is a schematic sectional view showing a structure around the combustion chamber when a piston is located at a top dead center position.

Within the cylinder C, a combustion chamber 5 is defined above the piston 3. FIG. 2 is a schematic perspective view showing a structure around the combustion chamber 5 of the engine body. FIG. 3 is a schematic sectional view showing a structure around the combustion chamber 5 of the engine body when the piston 3 is located at a top dead center position. A ceiling region 5a of the combustion chamber 5 is defined by a depressed area of a lower surface of the cylinder head 2. In this embodiment, the combustion chamber 5 is a so-called pentroof type which is formed in a triangular roof shape having an intake-side inclined surface and an exhaust-side inclined surface.

The cylinder head 2 is formed with two intake ports 6 and two exhaust ports 7 each communicating with the combustion chamber 5. In this embodiment, the intake ports 6 are opened to the intake-side inclined surface defining the ceiling region 5a of the combustion chamber 5, and the exhaust ports 7 are opened to the exhaust-side inclined surface defining the ceiling region 5a of the combustion chamber 5. The cylinder head 2 is provided with two intake valves 8 each adapted to shut off a respective one of the intake ports 6 from the combustion chamber 5, and two exhaust valves 9 each adapted to shut off a respective one of the exhaust ports 7 from the combustion chamber 5. Each of the intake valves 8 and the exhaust valves 9 is adapted to be selectively opened and closed at a give timing by a non-illustrated valve-operating mechanism.

A single spark plug 11 is installed in the cylinder head 2 in a posture extending along the axis c1 of the cylinder. In this state, a distal end of the spark plug 11 faces the combustion chamber 5 from an approximately central position of the ceiling region 5a of the combustion chamber 5. The spark plug 11 is adapted to generate a spark within the combustion chamber 5 at a given timing to ignite an air-fuel mixture within the combustion chamber 5.

An injector (fuel injection valve) 10 is installed in the cylinder head 2 to directly inject fuel into the combustion chamber 5. In this state, a distal end of the injector 11 faces the combustion chamber 5. More specifically, the injector 10 is installed such that the distal end thereof is located below the two intake ports 6 and at an intermediate position between the two intake ports 6 in a horizontal direction. The injector 10 is adapted to inject fuel from an outer periphery toward a center of the combustion chamber 5 at a given timing. Although the engine E according to this embodiment is designed while assuming a direct injection-type, the present invention can also be applied to a port injection-type engine.

A top surface 3a of the piston 3, i.e., a portion of the piston 3 defining a floor region of the combustion chamber 5, is formed with a raised portion 31 which is raised from respective intake and exhaust sides toward a central region thereof in conformity to the triangular roof shape of the ceiling region 5a of the combustion chamber 5. The formation of the raised portion 31 is useful in adjusting a volume of the combustion chamber 5 to set a geometric compression ratio of the cylinder C to a high value. The formation of the raised portion 31 is also desirable in terms of flame propagation characteristics, because a height of the combustion chamber 5 is approximately equalized in its entirety.

A concave portion 32 is formed in the raised portion 31. The concave portion 32 is provided around a center of the raised portion 3 and just below the spark plug 11. If a flame grown from an ignition point of the spark plug 11 prematurely collides with the top surface 3a of the piston 3, a flame growth rate becomes lower, which causes deterioration in flame propagation characteristics and therefore deterioration in engine thermal efficiency. In this regard, the concave portion 32 provided in the engine E makes it possible to delay the collision between a flame grown from the ignition point of the spark plug 11 and the top surface 3a of the piston 3 to improve the flame propagation characteristics. It is understood that a specific shape of the concave portion 32 is not limited to a bowl-like shape illustrated in FIG. 2.

Figure 4:
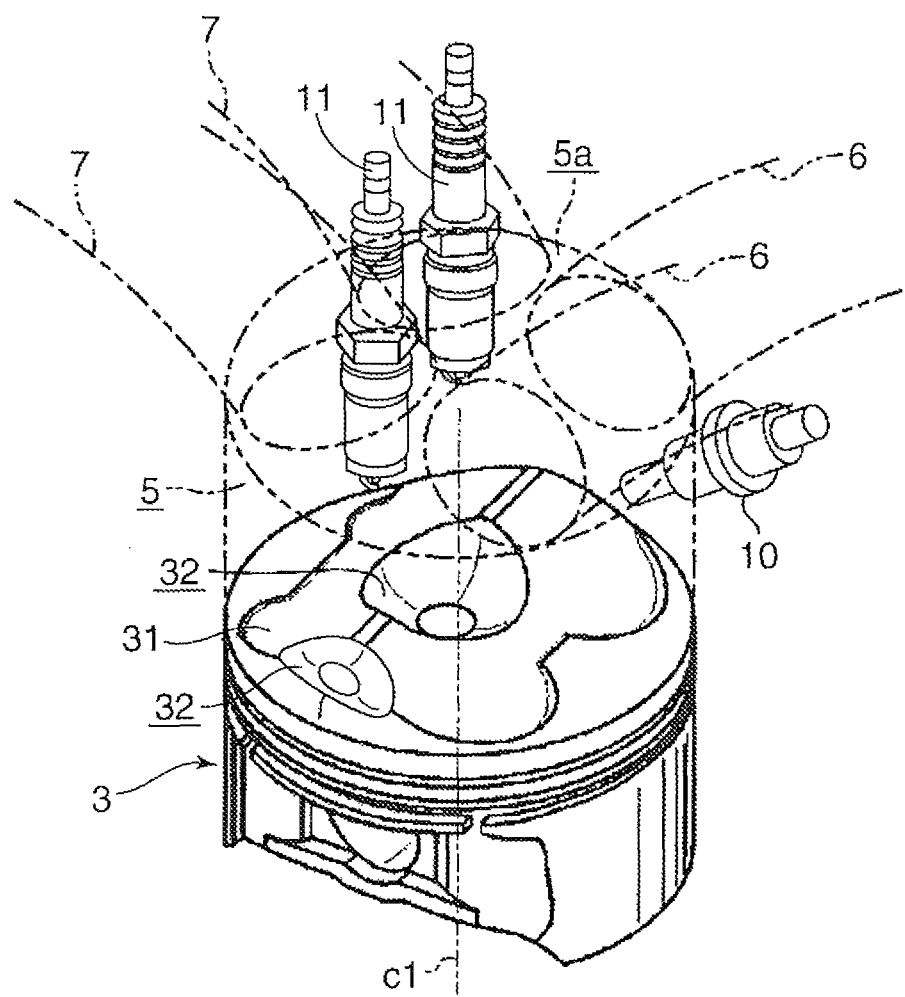
FIG. 4 is a schematic perspective view showing a structure of a two-point spark-ignition internal combustion engine around a combustion chamber.

The number of the spark plugs 11 to be provided per cylinder C may be two. In a two-point spark-ignition engine E where two spark plugs 11 are provided per cylinder C as above, one of the spark plugs 11 is installed approximately at a center of the ceiling region 5a of the combustion chamber 5 in the same manner as that in the aforementioned single-point spark-ignition engine E where only one spark plug 11 is provided per cylinder C, and the other spark plug 11 is installed approximately in an outer periphery of the ceiling region 5a of the combustion chamber 5, as shown in FIG. 4. Further, two concave portions 32 are provided in the raised portion 31 at positions corresponding to the spark plugs 11.

In the above engine E according to this embodiment, in order to provide enhanced engine thermal efficiency and improved fuel economy, a geometric compression ratio $\epsilon$ of the engine body is set to 14 or more. As is well known, the geometric compression ratio $\epsilon$ is expressed as $(V0+V1)/V1$, where V1 is a volume (total volume including a volume of the concave portion 32) of the combustion chamber 5 when the piston 3 is located at a top dead center (TDC) position, and V0 is an engine displacement (stroke volume).

In this embodiment, on the assumption that the geometric compression ratio $\epsilon$ of the engine body is set to 14.0, a stroke length S of the piston 3 is set to 81.2 mm or more, in order to ensure an output torque in a low-speed/high-load operation region. Further, in order to allow a maximum output power of the engine E to become 70 PS/L or more, the stroke length S of the piston 3 is set to satisfy the following relationship: $S \leq 0.977 \times B + 18.2$, where B is a bore diameter of the cylinder C. Specifically, in the graph illustrated in FIG. 5 which represents a relationship between the bore diameter B and the stroke length S, the stroke length S and the bore diameter B are set in the region A between by the line $Lb\_14$ on which the stroke length S is 81.2 mm, and the line $La\_70$ on which the stroke length S is "$0.977 \times B + 18.2$".

Figure 5:
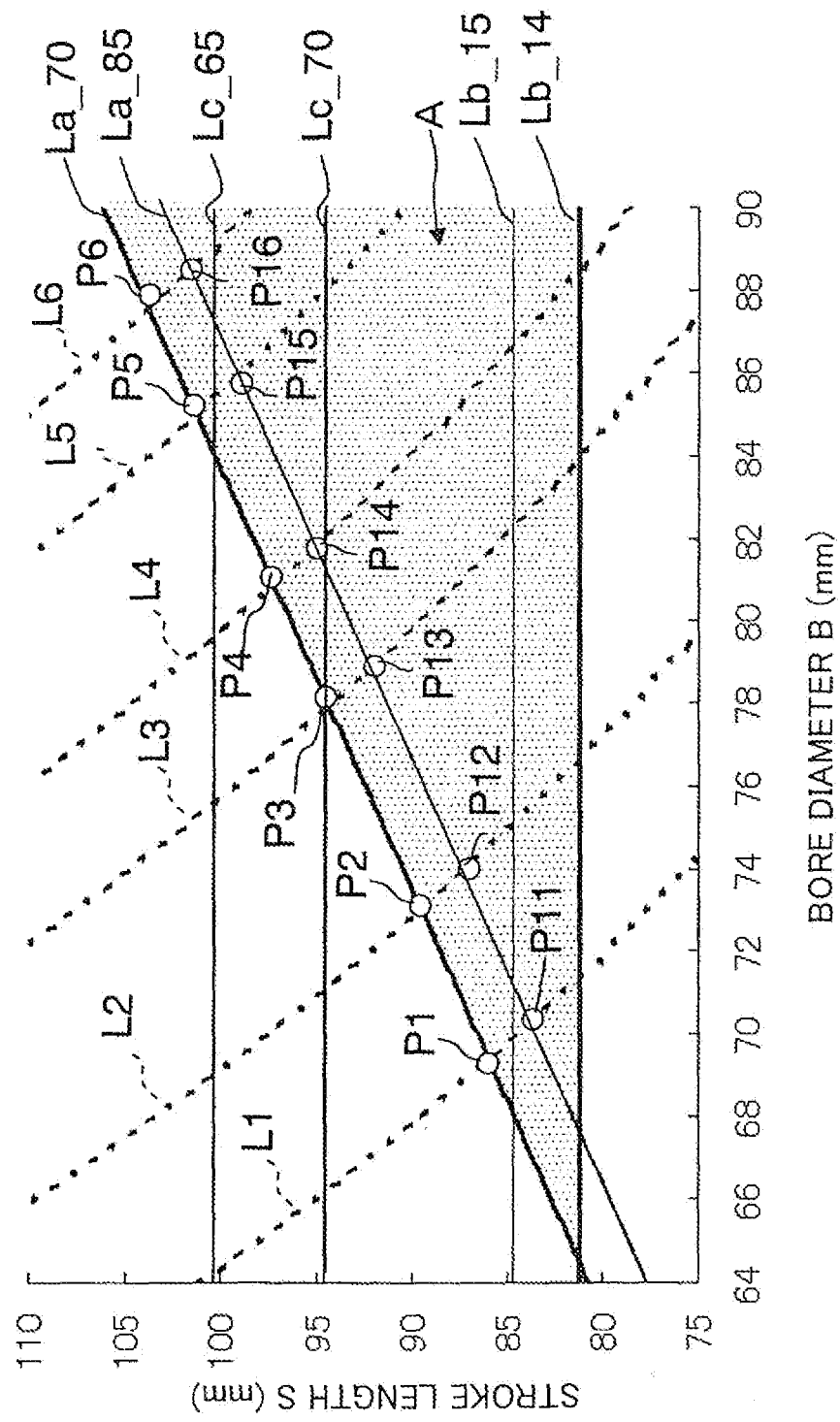
FIG. 5 is a graph showing a relationship between a bore diameter and a stroke length.

In FIG. 5, each of the dashed lines L1 to L6 is a constant-displacement line which represents a relationship between the stroke length S and the bore diameter B in an engine body having a certain engine displacement. Specifically, values of the stroke length S and the bore diameter B providing engine displacements of 1.3 liter, 1.5 liter, 1.8 liter, 2.0 liter, 2.3 liter and 2.5 liter, are plotted on L1, L2, L3, L4, L5 and L6, respectively.

Thus, in this embodiment, each of the stroke length S of the piston 3 and the bore diameter B of the cylinder C is set to a value on a line segment located within the region A in one of the constant-displacement lines L1 to L6 corresponding to a required engine displacement of the engine body.

The stroke length S is set to satisfy the above conditions, based on the following research results.

Firstly, a result of a research on the condition "$S \leq 0.977 \times B + 18.2$" will be described.

As mentioned above, if a flame grown from the ignition point of the spark plug 11 prematurely collides with the top surface 3a of the piston 3, engine thermal efficiency will deteriorate. Thus, it is desirable that a clearance between the spark plug 11 and the top surface 3a of the piston 3, i.e., a height of the combustion chamber 5, is increased to some extent. For this reason, as a prerequisite to setting the geometric compression ratio $\epsilon$ of the engine body to a higher value, it is necessary to increase the stroke length S of the piston 3. However, as shown by each of the contact-displacement lines in FIG. 5, as the stroke length S of the piston 3 is increased, the bore diameter B of the cylinder C becomes relatively smaller. If the bore diameter B becomes smaller, a diameter of each of the intake valves 8 becomes smaller, and thereby an opening area of the intake valve 8 becomes smaller. This is liable to cause failing to charge a sufficient amount of intake air into the cylinder 11 during an increase in engine speed, resulting in lowering of engine output power.

Therefore, the inventors checked an influence of the bore diameter B and the diameter of the intake valve 8, on the engine output power, under a constant engine displacement. Specifically, a plurality of types of engines were prepared to have the same engine displacement and become different from each other in the bore diameter B of the cylinder C and therefore in size of the ceiling region of the combustion chamber 5 and the diameter of the intake valve 8, and then a maximum engine output power of each of the engines was measured. This measurement was performed for a plurality of engines each having a different engine displacement, specifically, a plurality of engines having engine displacements of 1.3 liter, 1.5 liter, 1.8 liter, 2.0 liter, 2.3 liter and 2.5 liter, respectively. A result of the measurement is shown in FIG. 6. As shown in FIG. 6, as the bore diameter B of the cylinder C becomes larger and thereby the diameter of the intake valve 8 becomes lager, the maximum engine output power becomes higher. In FIG. 6, the lines L11, L12, L13, L14, L15 and L16 are respective measurement results in the engines having the engine displacements of 1.3 liter, 1.5 liter, 1.8 liter, 2.0 liter, 2.3 liter and 2.5 liter, wherein an engine speed at a maximum engine output power of 70 PS/L is 6500 rpm, and an engine speed at a maximum engine output power of 85 PS/L is 7000 rpm.

The bore diameter B achieving a maximum engine output power of 70 PS/L (hereinafter referred to as "70 PS/L bore diameter") in each of the engine displacements, and the stroke length S corresponding to the 70 PS/L bore diameter, were plotted on the graph in FIG. 5 (points P1 to P6). As a result, it was found that the 70 PS/L bore diameter and the stroke length S have the following relationship: $S=0.977\times B+18.2$, irrespective of engine displacement. This means that a maximum engine output power of 70 PS/L or more can be ensured by setting the bore diameter B to a value greater than the 70 PS/L bore diameter, i.e., setting the stroke length S to a value equal to or less than a linear function of the bore diameter B: $0.977\times B+18.2$.

Further, the bore diameter B achieving a maximum engine output power of 85 PS/L (hereinafter referred to as "85 PS/L bore diameter") in each of the engine displacements, and the stroke length S corresponding to the 85 PS/L bore diameter, were plotted on the graph in FIG. 5 (points P11 to P16). As a result, it was found that the 85 PS/L bore diameter and the stroke length S have the following relationship: $S=0.977\times B+15.1$ (straight line La_85 in FIG. 5), irrespective of engine displacement. This means that a maximum engine output power of 85 PS/L or more can be ensured by setting the bore diameter B to a value greater than the 85 PS/L bore diameter, i.e., setting the stroke length S to a value equal to or less than a linear function of the bore diameter B: $0.977\times B+15.1$.

A result of a research on the condition "$S\geq 81.2$" will be described below.

As mentioned above, as a prerequisite to increasing the geometric compression ratio $\epsilon$ of the engine body while ensuring a given level of height of the combustion chamber 5, it is necessary to increase the stroke length S of the piston 3 to some extent. In this regard, the inventor found that a lower limit value of the stroke length S is determined by a requirement of ensuring an output torque in a low-load operation region, in addition to the aforementioned requirement of avoiding the premature collision between a flame and the top surface 3a of the piston 3.

In a low-speed and high-load operating region of the engine body, it is necessary to open the intake valves 8 and the exhaust valves 9 to scavenge an inside of the cylinder C so as to sufficiently introduce fresh air into the cylinder C and reduce an internal temperature of the cylinder C to avoid the occurrence of knocking. In this regard, the inventor carried out a test using a plurality of types of engines. As a result, it was proven that, as a prerequisite to obtain an output torque of 100 Nm or more per 1000 cc engine displacement at 2000 rpm, it is necessary to set a valve overlap period where all of the intake valves 8 and the exhaust valves 9 are overlappingly opened, to 35 degrees in crank angle (CA) across top dead center. In cases where the valve overlap period is set to 35 degrees in CA across top dead center, each of the intake valves 8 and the exhaust valves 9 comes closest to the piston 3 around BTDC (before top dead center) 9-degree CA and ATDC (after top dead center) 8-degree CA. As a prerequisite to avoiding collision between each of the intake and exhaust valves 8, 9 and the piston 3, it is necessary to set a distance between the top surface 3a of the piston 3 located at a top dead center position and a lower surface (8a, 9a) of each of the intake and exhaust valves 8, 9 in a full-closed state, to 5 mm or more in a moving direction of each of the intake and exhaust valves 8, 9, i.e., in a direction perpendicular to the lower surface (8a, 9a).

In order to facilitate understanding of the relational expression regarding the bore diameter and the stroke length, the relational expression was simplified and modeled as follows. A volume V1 of the combustion chamber 5 is expressed as $V1=A\times h\times K1+(A-K2)\times K3$, where: A is a cross-sectional area of the cylinder (A=engine displacement per cylinder C V0/stroke length S); h is a distance between the top surface 3a of the piston 3 and the lower surface (8a, 9a) of each of the intake and exhaust valves 8, 9; $A\times h\times K1$ is a volume between lower surface (8a, 9a) of each of the intake and exhaust valves 8, 9 and the top surface 3a of the piston 3; K1 is a constant to be determined depending on a shape of the combustion chamber 5; $(A-K2)\times K3$ is a volume of a gap between each of the intake and exhaust valves 8, 9 and the cylinder head 2; K2 is a sum of respective valve areas of the intake and exhaust valves 8, 9; and K3 is a constant equivalent to a height of the gap. As a prerequisite to setting the geometric compression ratio to $\epsilon$ or more, it is necessary to set the volume V1 of the combustion chamber 5 to "$(\epsilon-1)\times V0$" or less. This expression is converted as follows by assigning the above formula regarding V1 thereto: $h\leq (V0/(\epsilon-1)-(A-K2))\times K3)/AK1$. As a prerequisite to obtaining a height h of 5 mm or more as mentioned above, it is necessary to satisfy at least the following relationship: $(V0/(\epsilon-1)-(A-K2))\times K3)/AK1\geq 5$. Based on this expression, a requirement to allow the distance between the top surface 3a of the piston 3 and the lower surface (8a, 9a) of each of the intake and exhaust valves 8, 9 in the single-point spark-ignition engine having a geometric compression ratio of 14 or more to become 5 mm or more is calculated as $S\geq 81.2$ mm. Further, in the single-point spark-ignition engine having a geometric compression ratio of 15 or more, or in the two-point spark-ignition engine E having a geometric compression ratio of 14 or more, the requirement is calculated as $S\geq 84.75$ mm. The straight line Lb_15 in FIG. 5 is a line on which the stroke length S is 84.75 mm.

Based on the above research results, in the single-point spark-ignition engine, the stroke length S can be set in the region A in FIG. 5, i.e., the region between by the straight line La_70 and the straight line Lb_14. This makes it possible to ensure the output torque in the low-speed/high-load operation region while setting the geometric compression ratio to 14 or more. This also makes it possible to achieve a maximum engine output power of 70 PS/L (at 6500 rpm) and ensure the valve overlap period while avoiding the collision between the piston 3 and each of the intake and exhaust valves 8, 9. Further, in the single-point spark-ignition engine, the stroke length S can be set in the region surrounded by the straight line La_85 and the straight line Lb_15. This makes it possible to ensure the output torque in the low-speed/high-load operation region while setting the geometric compression ratio to 15 or more. This also makes it possible to achieve a maximum engine output power of 85 PS/L (at 7000 rpm) and ensure the valve overlap period.

In this case, as is well known, it is preferable that an average piston velocity of the piston 3 is set to a given value or less, e.g., 22 m/s or less, in view of durability of the piston 3. For this reason, it is preferable that the stroke length S is set to a value allowing the average piston velocity to become 22 m/s or less, while taking into account the linear function of the bore diameter B. Specifically, it is preferable to set the stroke length S to 100.4 mm or less when the engine speed is 6500 rpm. it is also preferable to set the stroke length S to 94.6 mm or less when the engine speed is 7000 rpm. More specifically, it is preferable that the stroke length S is set in a region below the straight line Lc_65 in FIG. 5 on which the stroke length S is 100.4 mm, or in a region below the straight line Lc_70 in FIG. 5 on which the stroke length S is 94.6

It is understood that the spark-ignition internal combustion engine of the present invention is not limited to the type in the above embodiment, but the present invention may be applied to any other suitable type of spark-ignition internal combustion engine. For example, the engine E may be any multi-cylinder engine other than a four-cylinder engine, such as a six-cylinder engine.

As above, the inventor made various researches on the relationship between respective ones of a stroke length S, a bore diameter B and engine output power by variously changing the stroke length S, the bore diameter B and a diameter of an intake valve in various engine displacements. As a result, the inventor found that a given value or more of the engine output power can be obtained if the stroke length S and the bore diameter B satisfy a certain relationship. Further, in the course of the researches, the inventor found that, as a prerequisite to ensuring a sufficient amount of flesh air in a cylinder C and reducing residual gas in the cylinder C to reduce an internal temperature of the cylinder C, in a low-speed/high-load operation region, it is necessary to provide a valve overlap period where all of two intake valves 6 and two exhaust valves 8 are overlappingly opened, to ensure a given scavenging capability, and, as a prerequisite to achieving this valve overlap, it is necessary to set a clearance between a lower surface (8$a$, 9$a$) of each of the intake and exhaust valves 8, 9 and a top surface 3$a$ of a piston 3, to a given value or more.

Based on the above research findings, the present invention provides a spark-ignition internal combustion engine which comprises: an engine body including a cylinder, a piston adapted to be reciprocatingly moved within the cylinder, and a cylinder head provided on the cylinder to define a combustion chamber in cooperation with a top surface of the piston; two intake valves provided in the cylinder head and each capable of shutting off an inflow of air into the cylinder; two exhaust valves provided in the cylinder head and each capable of shutting off an outflow of exhaust gas from the cylinder; a spark plug provided in the cylinder head to face the combustion chamber; and a fuel injection valve provided in the cylinder head to face the combustion chamber, wherein: a geometric compression ratio of the engine body is set to 14 or more; each of a clearance between the top surface of the piston located at a top dead center position and a lower surface of each of the intake valves in a full-closed state, and a clearance between the top surface of the piston located at the top dead center position and a lower surface of each of the exhaust valves in a full-closed state, is set to 5 mm or more; and a stroke length S of the piston is set to satisfy the following relationship: $S \leq 0.977 \times B + 18.2$, where B is a bore diameter of the cylinder.

The spark-ignition internal combustion engine of the present invention makes it possible to achieve high engine output power while setting the geometric compression ratio of the engine body to 14 or more to achieve high thermal efficiency and therefore high fuel economy performance.

Specifically, the stroke length S and the bore diameter B are set to satisfy the following relationship: $S \leq 0.977 \times B + 18.2$, to allow the bore diameter B to have a sufficient size, so that it becomes possible to ensure an opening area of the intake valve to ensure a cylinder air charge amount during a high-speed operation, while setting the geometric compression ratio of the engine body to a high value. The high geometric compression ratio contributes to achievement of high fuel economy performance, and the ensuring of the cylinder air charge amount contributes to achievement of high engine output power. In the present invention, the above expression is designed to ensure an engine output power of 70 PS or more per unit engine displacement. Thus, at least an engine output power of 70 PS/L can be obtained by satisfying the above expression.

In addition, the clearance between the lower surface of each of the intake and exhaust valves and the top surface of the piston is set to 5 mm or more, so that it becomes possible to simultaneously open the intake valves and the exhaust valves in a given lift amount around top dead center. This means that a scavenging capability is improved by the valve overlap. The improvement in the scavenging capability, i.e., a reduction in residual gas, makes it possible to reduce an internal temperature of the cylinder to allow an ignition timing to be controllably advanced, and increase an amount of fresh air in the cylinder to increase an output torque.

The stroke length S and the bore diameter B may be set to satisfy the following relationship: $S \leq 0.977 \times B + 15.1$, to ensure an engine output power of 85 PS/L or more.

Under a condition that the geometric compression ratio is 14 or more, a requirement to allow each of a clearance between the top surface of the piston located at a top dead center position and a lower surface of each of the intake valves in a full-closed state, and a clearance between the top surface of the piston located at the top dead center position and a lower surface of each of the exhaust valves in a full-closed state, to become 5 mm or more, is calculated as $S \geq 81.2$ mm. Thus, preferably, in the present invention, the stroke length S of the piston is set to 81.2 mm or more.

This makes it possible to ensure the valve overlap period around top dead center while setting the geometric compression ratio of the engine body to 14 or more.

In the present invention, under a condition that the geometric compression ratio is 15 or more, a requirement to allow each of a clearance between the top surface of the piston located at a top dead center position and a lower surface of each of the intake valves in a full-closed state, and a clearance between the top surface of the piston located at the top dead center position and a lower surface of each of the exhaust valves in a full-closed state, to become 5 mm or more, is calculated as $S \geq 84.75$ mm. Thus, preferably, in the present invention, the stroke length S of the piston is set to 84.75 mm or more.

This makes it possible to ensure the valve overlap period around top dead center while setting the geometric compression ratio of the engine body to 15 or more.

This application is based on Japanese Patent Application No. 2009-243571, filed in Japan Patent Office on Oct. 22, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A spark-ignition internal engine comprising:
   an engine body including a cylinder, a piston adapted to be reciprocatingly moved within the cylinder, and a cylinder head provided on the cylinder to define a combustion chamber in cooperation with a top surface of piston;
   two intake valves provided in the cylinder head and each capable of shutting off an inflow of air into the cylinder;
   two exhaust valves provided in the cylinder head and each capable of shutting off an outflow of exhaust gas from the cylinder;
   a spark plug provided in the cylinder head to face the combustion chamber; and
   a fuel injection valve provided in the cylinder head to face the combustion chamber,
   wherein:
   a geometric compression ratio of the engine body is set to 14 or more;
   in at least a low-speed and high-load operating region of the engine body where knocking is likely to occur, the intake valves and the exhaust valves are simultaneously opened during a given overlap period across top dead center, the overlap period being set to 35 degree CA or more in at least a part of the low-speed and high-load operating region;
   each of a clearance between the top surface of the piston located at a top dead center position and a lower surface of each of the intake valves in a full-closed state wherein the clearance is provided as a distance in a direction perpendicular to the lower surface of each of the intake valves, and a clearance between the top surface of the piston located at the top dead center position and a lower surface of each of the exhaust valves in a full-closed state wherein the clearance is provided as a distance in a direction perpendicular to the lower surface of each of the exhaust valves, is set to 5 mm or more; and
   a stroke length S of the piston is set to satisfy the following relationship: $81.2 < S < 0.977 \times B + 18.2$, where B (mm) is a bore diameter of the cylinder.

2. The spark-ignition internal combustion engine as defined in claim 1, wherein the stroke length S (mm) of the piston is set to satisfy the following relationship: $81.2 \leq S \leq 0.977 \times B + 15.1$, where B (mm) is a bore diameter of the cylinder.

3. The spark-ignition internal combustion engine as defined in claim 2, wherein the stroke length S of the piston is set to 84.75 mm or more.

4. The spark-ignition internal combustion engine as defined in claim 1, wherein the stroke length S of the piston is set to 84.75 mm or more.

5. The spark-ignition internal combustion engine as defined in claim 1, wherein: a ceiling region of the combustion chamber is formed in a triangular roof shape having an intake-side inclined surface and an exhaust-side inclined surface; the top surface of the piston has a raised portion which is raised from respective intake and exhaust sides toward a central region thereof; and a concave portion is formed in the central region of the raised portion.

6. A method for manufacturing a plurality of types of spark-ignition internal combustion engines having different engine displacement, said method comprising:
   providing an engine body including a cylinder,
   providing a piston adapted to be reciprocatingly moved within the cylinder,
   providing a cylinder head on the cylinder to define a combustion chamber in cooperation with a top surface of the piston;
   providing two intake valves in the cylinder head and each capable of shutting off an inflow of air into the cylinder;
   providing two exhaust valves in the cylinder head and each capable of shutting off an outflow of exhaust gas from the cylinder;
   providing a spark plug in the cylinder head to face the combustion chamber; and
   providing a fuel injection valve in the cylinder head to face the combustion chamber,
   wherein said method for manufacturing all the plurality of types of spark-ignition internal combustion engines having different engine displacement satisfy all of following (1) to (4) specifications:
   (1) a geometric compression ratio of the engine body is set to 14 or more;
   (2) an opening/closing timing of the intake valves and the exhaust valves is set in such a manner that, in at least a low-speed and high-load operating region of the engine body where knocking is likely to occur, the intake valves and exhaust valves are simultaneously opened during a given overlap period across top dead center, the overlap period being set to 35 degrees CA or more in at least a part of the low-speed and high-load operating region;
   (3) each of a clearance between the top surface of the piston located at a top dead center position and a lower surface of each of the intake valves in a full-closed state wherein the clearance is provided as a distance in a direction perpendicular to the lower surface of each of the intake valves, and a clearance between the top surface of the piston located at the top dead center position and a lower surface of each of the exhaust valves in a full-closed state wherein the clearance is provided as a distance in a direction perpendicular to the lower surface of each of the exhaust valves, is set to 5 mm or more; and
   (4) a stroke length of the piston and a bore diameter of the cylinder is set in such a manner that the following relationship is satisfied:

$81.2 < S < 0.977 \times B + 18.2$ where
   S (mm) is the stroke length of the piston, and
   B (mm) is the bore diameter of the cylinder.

* * * * *